Oct. 13, 1964  H. H. ROBBINS  3,152,386
TOOL HOLDER
Filed Aug. 17, 1961
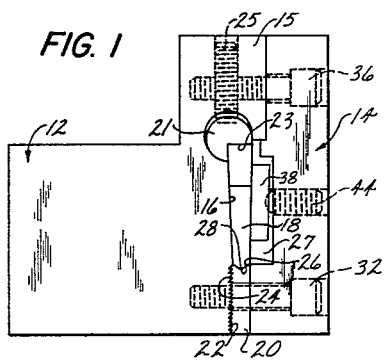
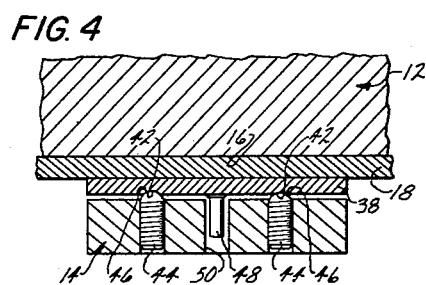
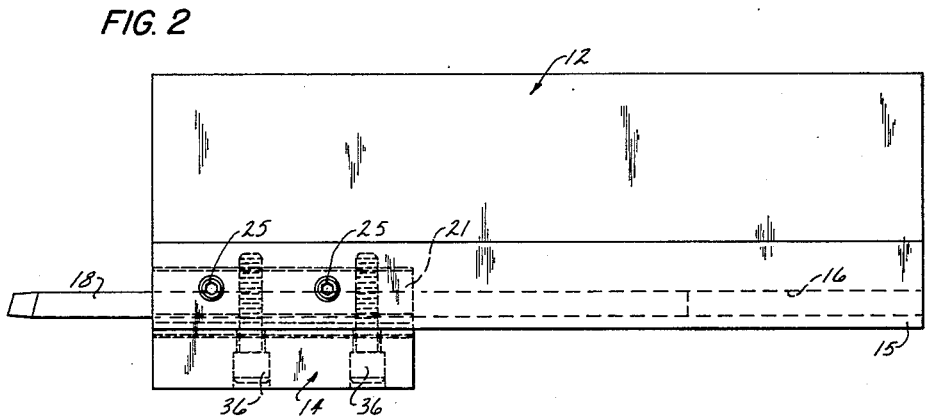
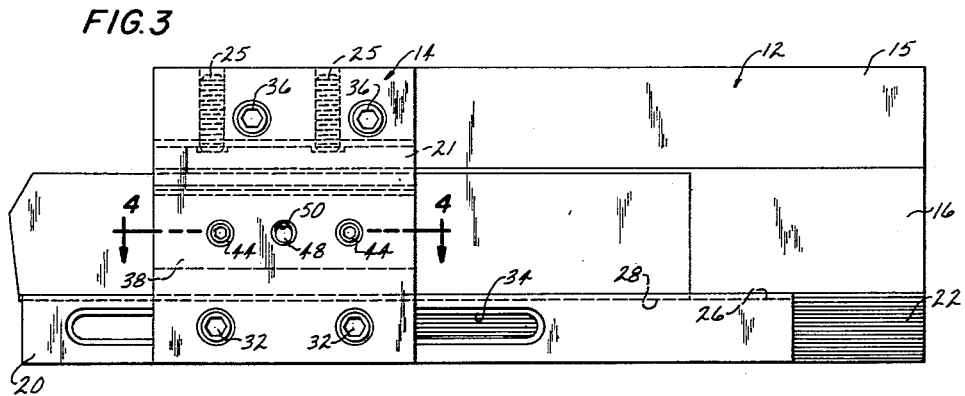
INVENTOR.
HARRIS H. ROBBINS
BY *Lindsey Prutzman, and Hayes*
ATTORNEYS

United States Patent Office 3,152,386
Patented Oct. 13, 1964

3,152,386
TOOL HOLDER
Harris H. Robbins, 96 Wintonbury Ave.,
Bloomfield, Conn.
Filed Aug. 17, 1961, Ser. No. 132,184
3 Claims. (Cl. 29—96)

This invention relates to tool holders having particular utility for supporting tools for use with lathes or other turning machinery.

It is a principal object of this invention to provide a new and improved tool holder which can rigidly support and accurately retain any one of a large variety of tools having different dimensions and used for different machining purposes.

It is another object of this invention to provide an improved tool holder which is readily adaptable without additional or accessory parts for firmly supporting a tool along its full length even though the tool be mounted to extend a substantial distance from the tool holder body.

It is a further object of this invention to provide an improved tool holder which has a unique arrangement of parts that can be economically manufactured and assembled and which can be readily disassembled for cleaning or for the replacement of parts.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a front end view of the tool holder of this invention with a tool held therein;

FIG. 2 is a top view of the tool holder and tool of FIG. 1;

FIG. 3 is a side view of the tool holder and tool; and

FIG. 4 is a fragmentary cross section view of the tool holder and tool taken substantially along the line 4—4 of FIG. 3.

Referring now to the drawings in detail, the tool holder of this invention includes a holder body with a generally L-shaped holder base 12 that is adapted to be mounted for retention as upon a lathe cross slide. The base 12 has on one side thereof a tool receiving recess extending beneath an upwardly and outwardly extending projection 15 and defined in part by a tool supporting face 16 engageable with one side of a cutting tool 18 which may be any one of a variety of tools used for forming, turning, facing or the like. Provided beneath the tool receiving recess and defining the lower edge thereof, is an elongated substantially flat tool support member 20 having a thickness approximately equal to the thickness of the cutting tool and an upper edge 26 in engagement with the lower edge of the tool. The support member is slidably mounted on the base 12 for rectilinear movement in the plane of the cutting tool and substantially parallel to the supporting face 16. The mounting is provided, preferably, through the cooperation of a plurality of parallel serrations 22 on the base and mating serrations 24 on the support member. The mounting may be provided, however, by other means, as for example, by a ledge (not shown) integrally extending from the base 12 beneath the support member, which give sufficient support to the member 20 so that it will adequately support the cutting tool even though both the tool and support member be extended a substantial distance forwardly of the tool holder body.

The cutting tool 18 is clamped upon the support member 20 by a clamping pin 21 defining the upper edge of the tool receiving opening and loosely mounted within the projection 15 for adjustment toward and away from the support member. The pin 21 is slotted at 23 for providing a firm engagement with the upper edge of the cutting tool and is readily adjustable by a pair of set screws 25 threaded within the projection 15 and accessible from above the tool holder. For rigidly retaining the extended portion of the cutting tool laterally on the support member, the support member and cutting tool may be provided with non-planar interfitting portions in the upper edge 26 of the support member and on the lower edge 28 of the tool, respectively. These interfitting portions are shown in FIG. 1 to comprise a generally V-shaped concave portion on the support member extending parallel to the serrations 24, and a conforming generally V-shaped convex portion on the lower edge of the cutting tool. With this interfitting relationship, chattering or other vibration in the extension of the cutting tool is substantially reduced or eliminated.

Fixed to the base 12 and forming a part of the holder body is a generally U-shaped side plate 14 having a central recess 27 opposite the tool supporting face 16 of the base. The side plate 14 is spaced from the supporting face so as to bridge the cutting tool 18 and is in engagement with the support member 20 and with the projection 15 to which it is affixed by means of a pair of cap screws 36. A second pair of cap screws 32 threaded within the base 12 and received within the side plate 14 and an elongated slot 34 in the support member extending parallel to its serrations, are provided to affix both the side plate 14 and the support member 20 rigidly to the base 12.

For clamping the cutting tool 18 against the supporting face 16 there are provided a floating shoe 38 positioned within the central recess 27 of the side plate 14 and a pair of longitudinally aligned set screws 44 threaded within the side plate 14 and in engagement with the floating shoe 38 for adjusting it toward and away from the tool supporting face. In order that the floating shoe 38 will automatically adjust to the angularity of the face of the cutting tool in engagement therewith, the floating shoe is provided with a pair of partially spherical seats 42 (FIG. 4) that receive the partially spherical ends 46 of the clamping screws 44. A fixed retaining pin 48 is fixed to the floating shoe 38 and is loosely received within an opening 50 in the side plate 14 so as to maintain the seats 42 in alignment with the screws 44 and to prevent removal of the floating shoe unless the side plate 14 is disassembled from the base 12.

It can be seen, therefore, that the tool holder of this invention is adaptable for retaining and rigidly supporting cutting tools having a variety of machining uses. Additionally, the cutting tool may be readily removed from the tool holder merely by loosening the set screws 25 and 44, and, where the cutting tool is to be adjusted longitudinally within the tool holder, the tool support member 20 may be readily adjusted to conform thereto by merely loosening the set screws 32. Further, the tool holder may be used not only as a left-hand tool holder as shown in the drawings, but additionally as a right-hand tool holder by either making the length of the base 12 and side plate 14 substantially equal or by making provision for mounting the side plate 14 and the clamping pin 21 on the opposite end of the base.

As will be apparent to persons skilled in the art, various modifications and adaptations of the structure above described will become readily apparent without departure from the spirit and scope of the invention, the scope of which is defined in the appended claims.

I claim:

1. A tool holder comprising, a holder body including a base portion having a tool supporting face engageable with a tool mounted on the holder and further having a plurality of parallel serrations adjacent said tool supporting face, a tool support member having serrations cooperably engaging the serrations of the base portion and a tool supporting edge extending parallel to the serrations, said tool supporting edge being concave for receiving a tool edge portion conforming thereto, an elongated slot in the tool support member extending parallel to its serrations, said holder body further including a side portion spaced from and bridging said tool supporting face, said side portion being in engagement with the base portion and the tool support member on opposite sides of said tool supporting face, first screw means received within the side portion and the elongated slot and threaded within the base portion and fixing the side portion and the tool support member to the base portion, second screw means fixing the side portion to the base portion on the opposite side of the tool supporting face from the tool support member, a tool clamping shoe positioned between the side portion and the tool supporting face, and clamping screw means threaded within the side portion in engagement with the clamping shoe.

2. A tool holder for an elongated tool having a forward upper cutting edge thereon comprising a holder body having a base with a tool supporting face engageable with one side of a tool mounted on the holder, a tool support member slidably mounted on the base for rectilinear longitudinal adjustment adjacent said tool supporting face, said support member having a tool supporting seat extending generally normal to said tool supporting surface for engagement with a lower edge of the tool, said holder body having a side plate spaced opposite said tool supporting face and in engagement with the tool support member, fastener means for securing the side plate and the tool support member to the base, and tool clamping means on the holder body adjustable toward and away from the tool seat and the tool supporting face for clamping the tool against the tool support member and the base.

3. A tool holder for an elongated tool having a forward upper cutting edge thereon comprising, an elongated holder body having a base with a tool supporting face engageable with one side of a tool mounted on the holder for supporting the tool against movement in a first lateral direction, a tool support member slidably mounted on the body for longitudinal rectilinear adjustment adjacent said supporting face of the body, said support member having a tool supporting seat extending generally normal to said supporting face for supporting the tool against movement in a second lateral direction substantially normal to said first lateral direction, tool clamping means on the holder body for clamping the tool against the tool seat, said holder body having a portion spaced from and bridging said tool supporting face, a floating clamping shoe positioned between the bridging portion and the tool supporting face, a clamping screw threaded within the bridging portion and having an end in engagement with the clamping shoe to adjustably move the shoe toward and away from the tool supporting face, said end of the clamping screw being partially spherical, said clamping shoe having a partially spherical seat receiving said end whereby the shoe will pivot about the clamping screw to adjust to the contour of a cutting tool mounted between the shoe and the tool supporting face, and means for adjustably securing the tool support member on the holder body independent of the clamping of the tool within the holder body.

References Cited in the file of this patent
UNITED STATES PATENTS

| | | |
|---|---|---|
| Re. 21,877 | Anthony | Aug. 19, 1941 |
| 945,674 | Barnes | Jan. 14, 1910 |
| 966,658 | Crick | Aug. 9, 1910 |
| 1,020,495 | Hartness | Mar. 19, 1912 |
| 1,120,783 | Amborn | Dec. 15, 1914 |
| 1,815,518 | Luers | July 21, 1931 |
| 1,835,958 | Luers | Dec. 8, 1931 |
| 1,863,131 | Taylor | June 14, 1932 |
| 2,243,239 | Zasada | May 27, 1941 |
| 2,254,056 | Anthony | Aug. 26, 1941 |
| 2,395,570 | McKenna | Feb. 26, 1946 |
| 2,416,975 | Anthony | Mar. 4, 1947 |
| 2,453,959 | Anthony | Nov. 16, 1948 |
| 2,487,209 | Anthony | Nov. 8, 1949 |
| 2,900,704 | Sweet | Aug. 25, 1959 |